July 13, 1954     J. P. SMITH     2,683,448
ROTARY MECHANICAL HEATER

Filed July 12, 1951     2 Sheets-Sheet 1

INVENTOR.
John Porter Smith
BY *Victor J. Evans & Co.*
ATTORNEYS

July 13, 1954 J. P. SMITH 2,683,448
ROTARY MECHANICAL HEATER
Filed July 12, 1951 2 Sheets-Sheet 2

INVENTOR.
John Porter Smith
BY Victor J. Evans & Co.
ATTORNEYS

Patented July 13, 1954

2,683,448

UNITED STATES PATENT OFFICE 2,683,448

ROTARY MECHANICAL HEATER

John Porter Smith, Euclid, Ohio, assignor of one-half to Leonard J. Wolf, Cleveland, Ohio Application July 12, 1951, Serial No. 236,423

2 Claims. (Cl. 126—247)

1

This invention relates to devices for converting mechanical energy into heat and particularly devices where heat is produced by shearing a liquid with unequal numbers of rotary and stationary blades, and in particular a rotary device having a plurality of rotors with notched radially disposed blades rotating between stationary radially disposed blades where the number of stationary blades is different from the number of blades of the rotors and wherein the rotation of the rotors circulates the liquid through a heater exchanger over which air is circulated with a blower for distributing the heated air to radiators and the like.

The purpose of this invention is to utilize heat resulting from frictional engagement of the blades of a rotor with a liquid circulated through stationary blades.

Various attempts have been made to utilize heat resulting from friction of rotary engines and other machine parts, however, unless the machine is used for the performance of work the proportionate amount of heat obtained in relation to the energy required to operate the machine does not warrant the use of such devices for average heating. With this thought in mind this invention contemplates a method of forming a rotary engine in which liquid is recirculated through rotary and stationary blades so that the temperature of the liquid is increased by the slicing or shearing action thereof with the rotary blades passing unequal numbers of stationary blades.

The object of this invention is, therefore, to provide means for constructing a rotary engine whereby the maximum amount of heat is produced by a friction between rotating and stationary parts and wherein the heat is transmitted to a liquid circulated through the parts.

Another object of the invention is to provide a heat exchanger in combination with a rotary engine for converting mechanical energy into heat whereby the heat is utilized by blowing air over the exchanger.

A further object of the invention is to provide a rotary engine in which the parts operate to convert mechanical energy into heat which is of a simple and economical construction.

With these and other objects and advantages in view the invention embodies a cylindrical housing having a shaft journalled therein with rotors having radially disposed blades carried by the shaft and positioned between radially disposed stationary blades, a heat exchanger having supply and return pipes connected to intake and outlet connections of the cylindrical housing and a blower for circulating air over the heat exchanger.

Other features and advantages of the invention will appear from the following description taken in connection with the drawings wherein.

Figure 1:
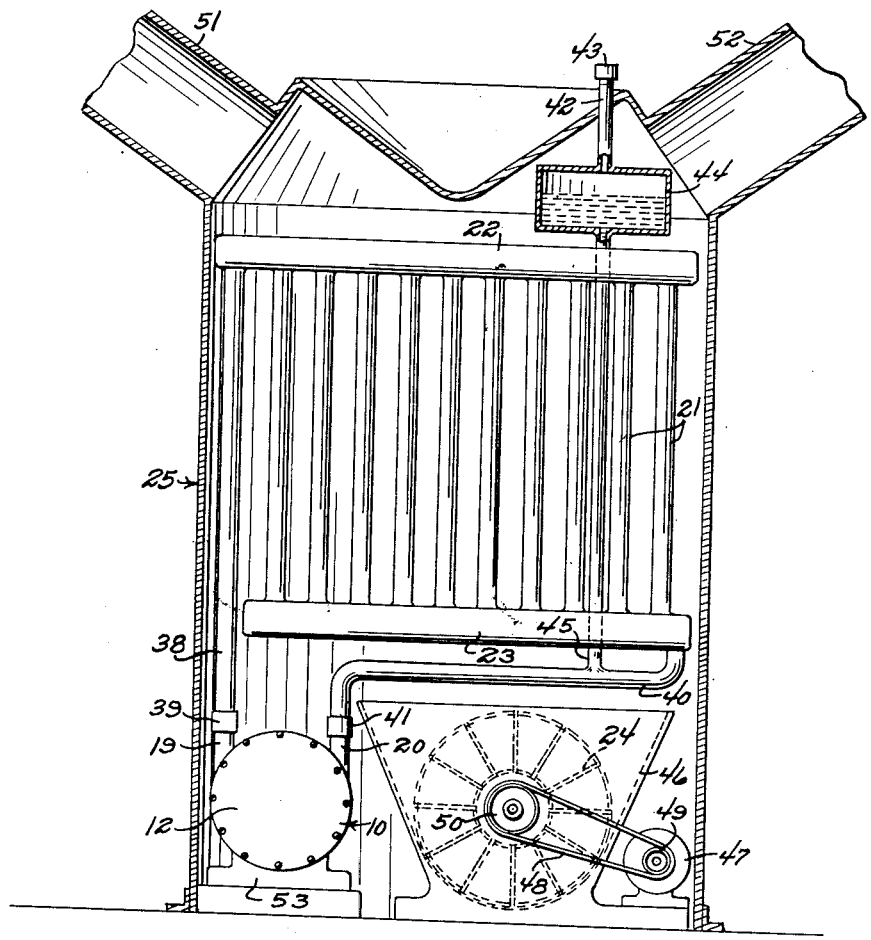
Figure 1 is an end elevational view of the heat exchanger rotary engine and blower housing illustrating these units in a surrounding housing which is shown in section.

Referring now to the drawings wherein like reference characters denote corresponding parts the device for the conversion of mechanical energy to heat of this invention includes a cylindrical housing 10 having a transverse partition 11, and ends or heads 12 and 13, a shaft 14 journalled in the heads, rotors having hubs 15 and radially disposed blades 16 mounted on the shaft, stationary radially disposed blades 17 and 18 mounted in the housing and positioned on opposite sides of the rotors, inlet connections 19 and outlet connections 20, and this rotary device is preferably used in combination with a heat exchanger having coils 21 positioned between headers 22 and 23 and a blower 24 which, with the heat exchanger is positioned in a housing 25.

The shaft 14, which may be connected to a motor or other suitable driving element 26 by a coupling 27 is journalled in the heads 12 and 13 with bearings 28 and 29, respectively, and the head 13 is provided with a hub 30 into which a bushing 31 is threaded to provide a packing gland 32.

The blades 16 of the rotors are provided with notches 33 that are positioned in the edges and the hubs 15 from which the blades extend are keyed to the shaft 14 by keys 34.

Figure 2:
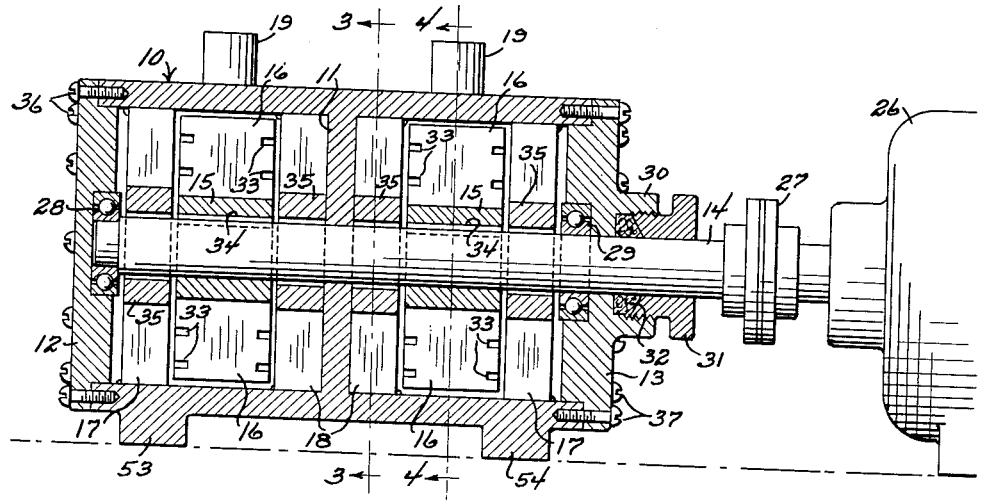
Figure 2 is a longitudinal section through the rotary engine showing the rotors with the radially disposed blades positioned between stationary and radially disposed blades.
Figure 3:
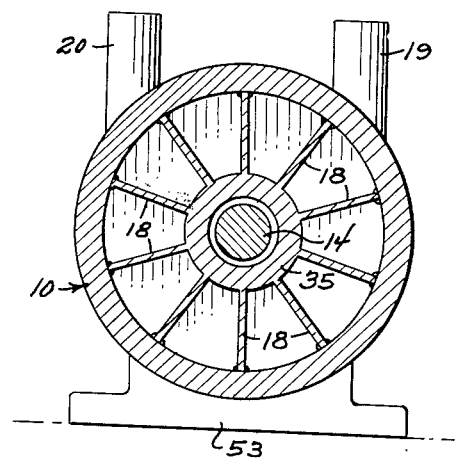
Figure 3 is a cross section through the rotary engine taken on line 3—3 of Fig. 2.
Figure 4:
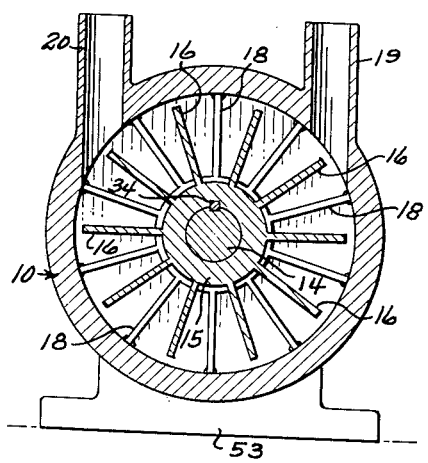
Figure 4 is a similar section taken on line 4—4 of Fig. 2 and showing, in particular, a rotor, stationary blades, and inlet and outlet connections of one section of the engine.

The stationary blades 18, the number of which is different from that of the blades of the rotors, extend inwardly from the inner surface of the housing and the inner edges are connected with hubs 35. The bores of the hubs are larger than the diameter of the shaft so that the inner surfaces of the hubs are spaced from the shafts as shown in Fig. 2.

As an illustration it is preferred to use 16 blades on the rotors and 15 blades in the stationary groups, however, it will be understood that any suitable number of blades may be used on both the rotors and in the stationary sections.

The head 12 is secured to the end of the housing by cap screws or bolts 36 and the head 13 is secured to the opposite end by similar cap screws or bolts 37.

With the parts arranged as illustrated in Fig. 1, the inlet connection 19 is connected to a tube 38 of the heat exchanger by means of a coupling 39 and the discharge connection 20 is connected to the headers 23 by a tube 40 with a coupling 41 connecting the connection 20 to the tube 40.

The heat exchanger is provided with a filling tube 42 having a cap 43 thereon and the tube extends into an expansion and supply tank 44 from which a tube 45 extends to the pipe or tube 40.

The blower 24 is mounted in a housing 46 that is positioned below the coils of the heat exchanger and, as illustrated in Fig. 1, the blower is driven by a motor 47 through a belt 48 that is trained over pulleys 49 and 50, on the motor and blower, respectively.

The housing 25 is provided with outlet connections 51 and 52 through which the heated air or other fluid passing over the heat exchanger is carried to radiators, registers, or other outlet openings in a building or the like.

It will be understood that although the heat exchanger is illustrated as a means for utilizing heat from the rotary device, the rotary mechanical energy converting device is adapted to be used for other purposes.

For most efficient operation of the mechanical energy conversion device it is preferred to provide very close clearances around the blades, and as an example the clearance at the sides of the blades of the rotor or between the rotating and stationary blades should be from 5 to 25 thousandths of an inch and the clearance between the ends of the blades and inner surface of the housing between 10 and 25 thousandths of an inch.

Applicant does not, however, desire to be limited to these dimensions as they are only suggested as an example.

The purpose of providing unequal numbers of blades on the rotors and in the stationary elements is to reduce torque load, permitting the shaft to be rotated at a higher speed and thereby increasing the efficiency of the heating unit and reducing the power required to drive the unit.

With the intake and outlet connections positioned in this manner the unit not only heats liquids therein but also circulates the liquid through the heat exchanger, from which the heat is transferred to required points by means of forced air.

It will be understood that modifications may be made in the design and arrangement of the parts without departing from the spirit of the invention.

It will also be understood that although the unit is illustrated as having two rotors, one, or any number of rotors may be used.

What is claimed is:

1. In a rotary mechanical heater, the combination which comprises a cylindrical housing, heads mounted in the ends of the housing, said housing having spaced intake and discharge connections positioned on opposite sides of a vertical plane extended through the axis of the housing and said intake and discharge connections being positioned in a plane perpendicular to the axis of the housing, a horizontally disposed shaft journaled in the heads of the housing and positioned with one end of the shaft extended through the head, stationary hubs positioned around said shaft and positioned in the ends of the housing, spaced stationary radially disposed blades extended between the stationary hubs and the inner surface of the housing, a rotor hub fixedly mounted on the shaft and positioned between said stationary hubs, and radially disposed blades carried by and extended from said rotor hub.

2. In a rotary mechanical heater, the combination which comprises a cylindrical housing, heads mounted in the ends of the housing, said housing having spaced intake and discharge connections positioned on opposite sides of a vertical plane extended through the axis of the housing and said intake and discharge connections being positioned in a plane perpendicular to the axis of the housing, a horizontally disposed shaft journaled in the heads of the housing and positioned with one end of the shaft extended through the head, stationary hubs positioned around said shaft and positioned in the ends of the housing, spaced stationary radially disposed blades extended between the stationary hubs and the inner surface of the housing, a rotor hub fixedly mounted on the shaft and positioned between said stationary hubs, and radially disposed blades carried by and extended from said rotor hub, the number of blades on the rotor hub being different from the number of the blades on the stationary hubs.

References Cited in the file of this patent

UNITED STATES PATENTS

| Number | Name | Date |
| --- | --- | --- |
| 1,598,289 | Lee | Aug. 31, 1926 |
| 1,606,629 | Halbrook | Nov. 9, 1926 |
| 2,497,184 | O'Brien | Feb. 14, 1950 |

FOREIGN PATENTS

| Number | Country | Date |
| --- | --- | --- |
| 530,744 | France | Oct. 10, 1921 |